United States Patent
McKeon et al.

(10) Patent No.: US 7,917,760 B2
(45) Date of Patent: Mar. 29, 2011

(54) TAMPER RESISTANT MODULE HAVING SEPARATE CONTROL OF ISSUANCE AND CONTENT DELIVERY

(75) Inventors: Brian B. McKeon, Sausalito, CA (US); John W. Wood, San Francisco, CA (US); David Barrington Everett, Rustington (GB)

(73) Assignee: Multos Limited, High Holborn, London ( * ) Notice: Subject to any disclaimer, the term of this patent is extended or adjusted under 35 U.S.C. 154(b) by 951 days.

(21) Appl. No.: 11/821,052

(22) Filed: Jun. 20, 2007

(65) Prior Publication Data

US 2008/0010470 A1    Jan. 10, 2008

Related U.S. Application Data

(63) Continuation-in-part of application No. 11/729,509, filed on Mar. 29, 2007, now Pat. No. 7,734,923, which is a continuation of application No. 11/655,497, filed on Jan. 19, 2007, now Pat. No. 7,689,826, which is a continuation of application No. 09/932,013, filed on Aug. 17, 2001, now Pat. No. 7,469,339, which is a continuation of application No. 09/076,551, filed on May 12, 1998, now Pat. No. 6,317,832, which is a continuation of application No. 09/023,057, filed on Feb. 12, 1998, now Pat. No. 6,575,372.

(60) Provisional application No. 60/046,514, filed on May 15, 1997, provisional application No. 60/046,543, filed on May 15, 1997.

(30) Foreign Application Priority Data

Feb. 21, 1997   (GB) .................................. 9703591.9

(51) Int. Cl.
    *G06F 12/14*   (2006.01)
    *H04L 9/00*    (2006.01)
(52) U.S. Cl. ............................ 713/172; 235/492; 380/44
(58) Field of Classification Search .................. 713/172
    See application file for complete search history.

(56) References Cited

U.S. PATENT DOCUMENTS 5,923,884 A * 7/1999 Peyret et al. .................. 717/167

\* cited by examiner

*Primary Examiner* — Matthew B Smithers
(74) *Attorney, Agent, or Firm* — SNR Denton US LLP

(57) ABSTRACT

Methods, apparati and computer-readable media for securely loading a software module over a communications network from a software provider (SP)(101) onto a tamper resistant module (TRM)(103).

22 Claims, 11 Drawing Sheets

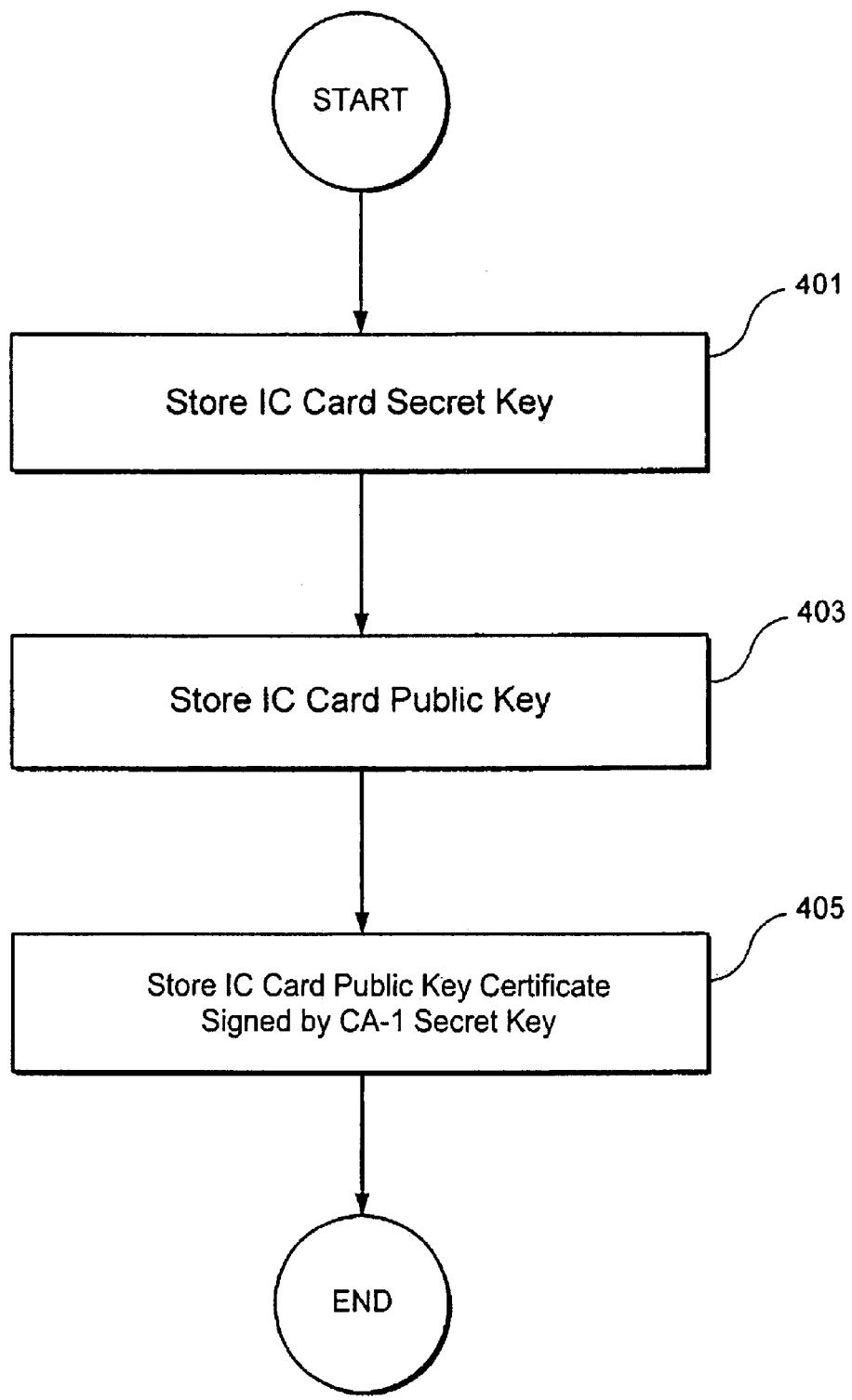
F I G. 4

TAMPER RESISTANT MODULE HAVING SEPARATE CONTROL OF ISSUANCE AND CONTENT DELIVERY

CROSS REFERENCES TO RELATED APPLICATIONS

This patent application is a continuation-in-part of and claims priority to U.S. patent application Ser. No. 11/729,509, filed on Mar. 29, 2007 now U.S. Pat. No. 7,734,923; patent application Ser. No. 11/729,509 is a continuation of and claims priority to 11/655,497, filed on Jan. 19, 2007 now U.S. Pat. No. 7,689,826; patent application Ser. No. 11/655,497 is a continuation of and claims priority to U.S. patent application Ser. No. 09/932,013, filed on Aug. 17, 2001 now U.S. Pat. No. 7,469,339; patent application Ser. No. 09/932,013 is a continuation of and claims priority to U.S. patent application Ser. No. 09/076,551, filed on May 12, 1998, now U.S. Pat. No. 6,317,832, entitled "Secure Multiple Application Card System and Process"; patent application Ser. No. 09/076,551 claims the priority benefit of U.S. provisional patent application No. 60/046,514 filed on May 15, 1997, entitled "Design for a Multi Application Smart Card", and further claims the priority benefit of U.S. provisional patent application No. 60/046,543 filed on May 15, 1997; and patent application Ser. No. 09/076,551 is a continuation of and claims priority to U.S. patent application Ser. No. 09/023,057, filed on Feb. 12, 1998, now U.S. Pat. No. 6,575,372, entitled "Secure Multi-Application IC Card System Having Selective Loading and Deleting Capability"; and this instant application also claims the priority benefit of U.S. provisional patent application 60/046,514 filed on May 15, 1997, entitled "Design for a Multi Application Smart Card"; U.S. provisional patent application 60/046,543 filed on May 15, 1997, entitled "Virtual Machine for a Multi Application Smart Card"; and Great Britain patent application 9703591.9 filed on Feb. 21, 1997 and entitled "Multiple Application Computer System." All eight of these prior patent applications are hereby incorporated by reference into the present patent application in their entireties.

TECHNICAL FIELD

This invention pertains to the field of distribution of computer software applications, and, in particular, for providing secure transmission of the software applications and secure loading of the software applications onto tamper resistant modules.

BACKGROUND OF THE INVENTION

The invention relates to a computer system in which a population of computers has access to multiple software applications. The computers may be personal computers (PC's) or, for example, integrated circuit cards ("IC cards"), also known as "smart cards". The applications may be programs available from a variety of sources, including computer tape or disc, and, in particular, remote computers with which a serial link, typically by telephone, is established.

In the PC environment, it is customary to distribute applications on floppy discs or CD ROMS and to retain them on a local hard disc for operation. In many ways, this is inconvenient, demanding high capacity local storage media and presenting difficulties with updates. In the field of smart cards, the problem of local application storage is much more acute, because storage capacity in the integrated circuit is relatively very limited. A solution in both cases is to make available applications held remotely and download them via a remote link. Internet and intranet systems are ideal vehicles for this, and it is possible to run PC's from Internet application modules (or "applets" as they are called) for immediate running and then to discard the applets. The applets require no local long-term storage capacity. An example of such a system is JAVA.

Several difficulties are associated with downloaded applications. One is hardware compatibility. Different computers have different microprocessors and different operating systems. It has been customary to re-write applications to cater to different computers, but this is cost-effective only for large, widely used, and static applications. It is not practicable for applets. A second problem is control of the applets. Without control, it would be possible for applets to make direct hardware calls to take control of local storage or communication devices. This could be mischievous at best and severely damaging or criminal at worst.

JAVA meets these two difficulties by ensuring that the applets are written in a common high-level interpreted language and that a local interpreter processes the applet instructions. Thus, all applets are written in the same language, and the interpreter constitutes both a hardware buffer and a control buffer. Similarly, and for the same reasons, proposals have been made for on-board interpreters in smart cards to run downloaded high-level language applications.

The wide availability of multiple applications to a population of computers raises another problem. For various reasons, it may be desirable to restrict the availability of certain applications to certain computers. For example, some applications may make demands which the hardware of a particular computer cannot meet. These represent technical limitations present in spite of the interpreter arrangement. Furthermore, there may be commercial or moral restraints to be placed on the accessibility of certain applications to certain computers. The present invention seeks to provide a solution to this problem.

IC cards are becoming increasingly used for many different purposes in the world today. An IC card typically contains a computer chip including a microprocessor, read-only-memory (ROM), electronically erasable programmable read only memory (EEPROM), an Input/Output (I/O) mechanism, and other circuitry to support the microprocessor in its operations. An IC card may contain a single application or may contain multiple independent applications in its memory. MULTOS™ is a multiple application operating system which runs on IC cards, among other platforms, and allows multiple applications to be executed on the IC card itself. This allows a card user to run many programs stored in the IC card (for example, credit/debit, electronic money/purse, and/or loyalty applications), irrespective of the type of terminal (i.e., ATM, telephone, and/or POS) in which the IC card is inserted for use.

A conventional single application IC card, such as a telephone card or an electronic cash card, is loaded with a single application at its personalization stage when it is manufactured and before it is given to a card user. That application, however, cannot be modified or changed after the IC card is issued, even if the modification is desired by the IC card user or issuer. Moreover, if a card user wanted a variety of application functions to be performed by IC cards issued to him or her, such as both an electronic purse and a credit/debit function, the card user would be required to carry multiple physical cards on his or her person, which would be quite cumbersome and inconvenient. If an application developer or card user desired two different applications to interact or exchange data with each other, such as a purse application interacting with a frequent flyer loyalty application, the card user would be forced to swap multiple cards in and out of the card-receiving terminal, making the transaction difficult, lengthy, and inconvenient.

Therefore, it is beneficial to store multiple applications on the same IC card. For example, a card user may have both a purse application and a credit/debit application on the same IC card, so that the user could select which type of payment (by electronic cash or credit card) to use to make a purchase. Multiple applications could be provided to an IC card if sufficient memory exists and an operating system capable of supporting multiple applications is present on the IC card. Although multiple applications could be preselected and placed in the memory of the IC card during its production stage, it would also be beneficial to have the ability to load and delete applications for the IC card post-production as needed.

The increased flexibility and power of storing multiple applications on a single IC card create new challenges to be overcome concerning the integrity and security of the information (including application code and associated data) exchanged between the individual IC card and the application provider, as well as within the entire system when loading and deleting applications. It would be beneficial to have the capability in the IC card system to exchange data among IC cards, IC card issuers, system operators and application providers securely and to load and delete applications securely at any time from a local terminal or remotely over a telephone line, Internet, or intranet connection or other data conduit. Because these data transmission lines are not typically secure lines, a number of security and entity authentication techniques must be implemented to make sure that applications being sent over the transmission lines are not tampered with and are loaded onto the intended IC cards only.

As mentioned, it is important—particularly where there is a continuing wide availability of new applications to the cardholder—that the system has the capability of adding applications onto the IC card subsequent to issuance. This is necessary to protect the longevity of the IC cards; otherwise, once an application becomes outdated, the IC card would be useless. It would be beneficial to allow the addition of applications from a remote location as well as from a direct connection to an application provider's terminal. For example, it would be beneficial for a card user to be able to plug his or her IC card into a home computer and download an application over the Internet. This type of remote loading of applications raises a number of security risks when transmitting the application code and related data over an unsecured communications line such as the Internet. Several issues need to be addressed in a system which provides such a capability.

One issue is to make sure that the IC card receiving the application is the intended IC card and not another IC card. A second issue is determining how the IC card can authenticate that the application came from the proper application provider and not an unknown third party. A third issue concerns preventing third parties from reading the application and making an unauthorized copy. If a portion of the application is encrypted to address the latter issue, the intended IC card needs to have access to the correct key to decrypt the application. In a system with many IC cards and additionally many application providers, a secure key transfer technique is required so that the intended IC card can use the correct key for the application which is received. Since the application provider and the IC card issuer will not, generally, be the same entity, the need also arises to protect the confidentiality of the application provider's data from the card issuer. These concerns are raised by both remote application loading as well as by local terminal application loading.

Accordingly, it is an object of this invention to provide secure transfer techniques, specifically, to provide a secure IC card system that allows for the transfer of data from a software application provider to an IC card while securing the proprietary data of application providers from, for example, inspection or copying by the IC card issuer.

According to the invention, a computer system comprises a population of computers; tamper-resistant modules each associated respectively with one of said computers; a plurality of computer applications; provider means for holding the computer applications; and means for coupling the provider means to the computers for downloading the computer applications to the computers.

The computers may be personal computers (PC's) or any other types of computers, in which case the tamper-resistant modules may be smart cards read by readers coupled to the computers or installed as Subscriber Identity Modules (SIM's) in mobile telephones or, for example, dongles, PC cards, or PCMCIA cards coupled to the computers. Furthermore, although the following description of the preferred embodiments revolves around a discussion of IC cards (or "smart cards"), the presently claimed methods and apparati are applicable to all tamper resistant modules generally, and not just to such cards. Thus, the term "tamper resistant module" can be used in lieu of the term "IC card" or "smart card" throughout this written description. The term "tamper resistant module" includes, but is not limited to, one or more IC cards, smart cards, SIM's, dongles, PC cards, and/or PCMCIA cards. The IC cards, smart cards, SIM's dongles, PC cards, and/or PCMCIA cards may be coupled to one or more computers or mobile phones.

DISCLOSURE OF INVENTION

Methods, apparati, and computer-readable media for securely loading a software module over a communications network from a software provider (SP) (101) onto a tamper resistant module (TRM) (103). A method embodiment of the present invention comprises: the SP (101) encrypting, using at least one transport key, at least one portion of the software module, each portion having an indication of location of the portion; the SP (101) encrypting each transport key and each indication using an asymmetric TRM public key, thereby forming a key transformation unit (KTU) (207), the TRM public key (150) having a corresponding TRM private key (190), the TRM public key (150) and corresponding TRM private key (190) being certified by a first certification authority (CA-1) (109); the SP (101) digitally signing the encrypted portion(s) with at least one asymmetric SP private key, each said SP private key having a corresponding SP public key, to produce a signed software module, each SP public key being certified by a second certification authority (CA-2) (119), CA2 (119) being different than CA-1 (109); and the SP (101) transmitting the portion(s), the KTU (207), and the signed software module to the TRM (103) over the communications network; and the TRM (103) recovering the transport key(s) and the indication(s) by decrypting the KTU (207) using the TRM private key (190); the TRM identifying the portion(s) using the recovered indication(s), verifying the certified SP public key using the public key of CA-2, authenticating the portion(s) using the certified SP public key; and decrypting the portion(s) using the recovered transport key(s).

BRIEF DESCRIPTION OF THE DRAWINGS

Further objects, features, and advantages of the invention will become apparent from the following detailed description taken in conjunction with the accompanying Figures showing illustrative embodiments of the invention, in which:

FIG. 4 is a flow chart of steps for providing an individual key set for an IC card 103;

Figure 1A:
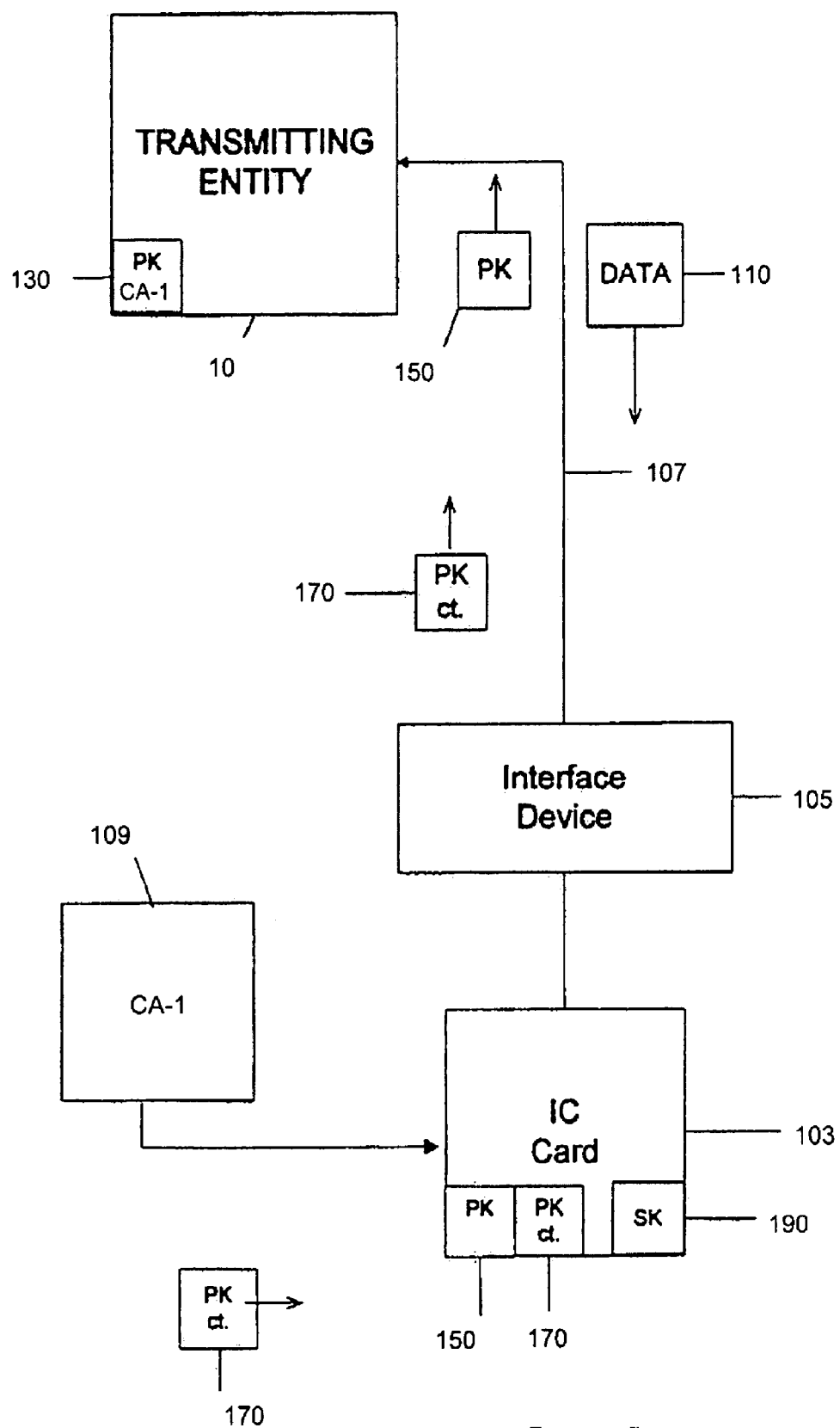
FIG. 1A is a block diagram of the secure data transfer system which securely transfers data from a transferring entity 101 to an IC card 103.

Throughout the Figures, the same reference numerals and characters, unless otherwise stated, are used to denote like features, elements, components, or portions of the illustrated embodiments. Moreover, while the subject invention will now be described in detail with reference to the Figures, it is done so in connection with the illustrative embodiments. It is intended that changes and modifications can be made to the described embodiments without departing from the true scope and spirit of the subject invention as defined by the appended claims.

DETAILED DESCRIPTION OF THE PREFERRED EMBODIMENTS

It is beneficial to have the capability to load applications onto IC cards containing multiple application operating systems at any time during the lifetime of the IC card or other tamper resistant module. This flexibility allows a user of an IC card to periodically add new applications to the IC card, and also allows older applications to be updated with newer versions of the application when they are released. For example, a card user may start with an IC card that contains a purse, or electronic cash application (e.g., MONDEX™), being stored on the IC card. Some time after the user has the IC card, he or she may load an additional application, such as a credit/debit application, onto the IC card. Some time after loading the credit/debit application onto the IC card, a new version of the credit/debit application may become available, and the card user should be able to erase the old application on the IC card and replace it with the new version of the credit/debit application, which may contain additional features. Additionally, an IC card needs to receive data regarding personal information, such as new credit card account numbers or updated information.

The flexibility of loading applications and transmitting data at different times during the IC card's life cycle creates security issues with the process of loading applications onto the IC card. In a multiple application operating system environment, it is beneficial to be able to load applications and data both at terminals, such as a bank ATM machine, as well as over remote communication links, such as telephone lines, cable lines, the Internet, satellite, or other communications means. When loading applications and data onto an IC card, the application provider and the card issuer (which could be the same entity) need to provide security regarding the applications to be loaded. First, the application provider must make sure the application is sent only to the correct card user who is intended to receive the application. One solution to this problem is addressed in a related patent, U.S. Pat. No. 6,575,372, entitled "Secure Multi-Application IC Card System Having Selective Loading and Deleting Capability" by Everett et al., assigned to the assignee of the present invention.

Two additional security concerns also need to be addressed when loading an application from a remote source, or even from a local terminal, onto an IC card. First, the source of the application must be authenticated as the proper originator so that applications which may contain viruses or simply take up the limited storage memory in an IC card are not allowed to be loaded onto the IC card. Second, the application and associated data may contain private or trade secret information which needs to be encrypted, so entities other than the IC card cannot view the contents of the encrypted application code and data. A portion of the application code and data may be secret while other portions are not. These concerns of authentication and protecting the contents of some or all of the application and associated data being loaded onto an IC card are addressed herein.

As used throughout this patent application, including the claims, "portion" can mean anything from a de minimus portion to 100% of the software application. Furthermore, "portion" can mean more than one portion.

A number of encryption/decryption techniques are described herein. There are two basic types of encryption, symmetric encryption and asymmetric encryption. Symmetric encryption uses a private key as part of a mathematical formula which encrypts data by transforming the data using the formula and key. After the data is encrypted, another party can decrypt the encrypted data using the same private key with a related decryption algorithm. Thus, the same key is used for encryption and decryption, so the technique is symmetric. A conventional example of a symmetric algorithm is the Data Encryption Standard (DES).

Asymmetric encryption techniques use two different keys of a pair for encrypting and decrypting information. The two keys are normally referred to as a private (or secret) key, and a public key. When data is encrypted with one key of the pair, the other key is used to decrypt the data. If a sender of data signs the data (or a digest of the data) with his private key, forming what is called a digital signature, anyone with the public key can verify the authenticity of the message. When person A wants to authenticate a message to person B, person A signs the document with his private key. When person B receives the message, he uses person A's public key to verify the authenticity of the message. If the message is verified with the public key, person B knows that the document was signed with the private key of person A. Thus, the originator of the message has been authenticated, person B knows that the message hasn't been altered in transit, and person A is not able to repudiate the message once sent.

The asymmetric key set can also be used to confidentially protect the contents of a message. If person A wants to send an encrypted message to person B that no one else can read, person A encrypts the data or message with person B's public key and sends it to person B. Now only the holder of person B's private key can decrypt the data. When a combination of keys is used, a person can both authenticate and encrypt the message. The asymmetric pair of keys has some powerful applications with respect to IC card security, and is more robust than symmetric encryption. However, asymmetric encryption is relatively more processor costly (processor cost is associated with computation time) compared with symmetric encryption. An example of asymmetric encryption method is RSA™.

A hybrid of symmetric encryption which makes the encryption method more powerful is to encrypt data using two symmetric keys. This technique, called triple DES, encodes data with symmetric key 1, decodes the data using symmetric key 2 (which in effect further encodes the data), and then further encodes the data using key 1 again. Once the data has arrived at its destination, key 1 is used to decode the data, key 2 is used to encode the data, and key 1 is used to decode the data. These extra steps of encoding and decoding make the technique more powerful and more difficult to properly decipher without both keys.

FIG. 1A shows a block diagram of entities used in transporting data in a secure manner in an IC card system. The transmitting entity 10 can be a software provider (SP) or application provider, a card issuer, bank, IC card, or other entity which desires to transport data to an IC card 103. The transmitting entity 10 preferably initiates the data transfer process. Alternatively, the IC card 103 can initiate the data transfer process when the IC card requires data from the transmitting entity 10.

The transmitting entity 10 is coupled to interface device 105 (e.g., a terminal that communicates with an IC card 103). Data conduit 107 can be a telephone line, an intranet, the Internet, a satellite link, or any other type of communications link. In this example, the transmitting entity 10, which is remotely located from IC card 103, desires to send data (for example, a software module) in a secure manner to the IC card 103. However, because the data link is an "open" link (i.e. not a private link) and subject to third parties possibly intercepting or replacing data being transmitted, security measures are needed to guarantee that only the intended IC card 103 receives the transmitted data. Certificate Authority (CA-1) 109, which may, for example be an agent of the IC card 103 issuer or an agent of a telephone network operator, can be used to authenticate that the IC card 103 has been validated as part of the IC card system.

In FIG. 1A, a private (or secret) key 190, and corresponding public key 150, are generated for IC card 103. The keys are preferably generated using an asymmetric encryption algorithm such as RS™ and certified by CA-1 109. The keys can be generated at (or even by) the IC card 103 itself, at the CA-1 109, or any other location, because the keys are specific only to that particular IC card 103, and no other copies need be kept. A third data item, the public key certificate 170, is generated by CA-1 109 and may be stored on the IC card 103 and/or at some other convenient location.

The public key certificate 170 is generated by signing public key 150 with the private key of CA-1 109. This allows a person with the public key of the CA-1 109 to verify that the CA-1 109 digitally signed the IC card's public key 150 in order to certify the IC card's individual key set. The public key certificate can be generated by the CA-1 109 at the time the IC card private/public key set is generated or at a subsequent time.

When a data transfer is initiated by the transmitting entity 10, the IC card 103 is contacted through the interface device 105, and the IC card 103 preferably sends its public key 150 and its public key certificate 170 to the transmitting entity 10. The transmitting entity 10 then verifies the public key certificate 170 with the public key 130 of the CA-1 109 (public key 130 is publicly available from the CA-1 109 and may be stored in the transmitting entity 10), thus determining whether the CA-1 109 digitally signed the public key 170 and verifying that the IC card 103 is a valid IC card.

The transmitting entity 10 then encrypts certain data to be transmitted with the IC card's public key 150. The transmitting entity 10 then transmits the encrypted data 110 to the interface device 105 and to the IC card 103. The IC card 103 decrypts the encrypted data with its corresponding private (also called secret) key 190. The data can then be processed by the IC card 103. Only the IC card 103 has a copy of its private key 109, so only the intended IC card 103 can access the encrypted data 110. This ensures that third parties cannot access the encrypted data 110, and correspondingly that only the intended IC card 103 is able to read and process the data.

Figure 1B:
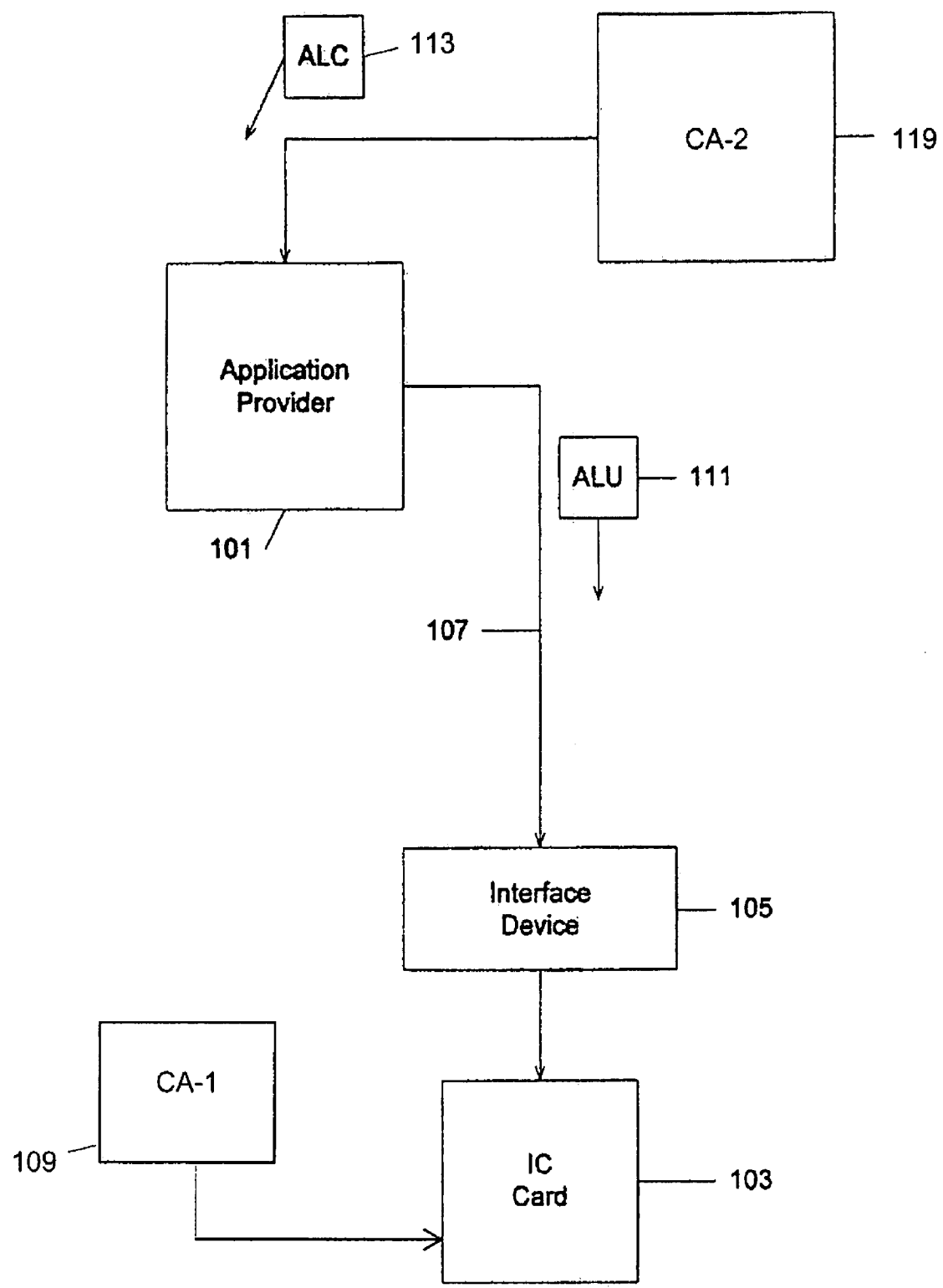
FIG. 1B is block diagram of the application loading system which loads a software module or application from a provider 101 to an IC card 103.

FIG. 1B shows a block diagram of the entities used in a secure method for loading software modules or applications onto an IC card 103. The application provider 101 can be an IC card issuer, bank or other entity which provides application loading services. The application provider 101 initiates an application loading process onto IC card 103. Application provider 101 is coupled to data conduit 107, which is coupled to interface device 105 (e.g., a terminal that communicates with an IC card 103).

Data conduit 107 can be a telephone line, an intranet, the Internet, a satellite link, or any other type of communications link. The application provider 101, which is remotely located from the IC card 103, desires to send and load an application to the IC card 103. However, because the data link 107 is an open link and subject to third parties possibly intercepting or replacing applications being transmitted, security measures which authenticate the application itself, the application provider 101 and the IC card 103 must be used to ensure the integrity of the system. Certificate authority (CA-2) 119, which may be, for example, an agent of the software provider or application provider 101, may also be used to help authenticate data being transferred.

In FIG. 1B, the application provider 101 sends an application load unit (ALU) 111 to the interface device 105 and finally to IC card 103. The ALU 111 includes the software application itself and security data required to authenticate and protect the application code and associated data. ALU 111 is discussed specifically in FIG. 2 and in connection with the other Figures herein. ALU 111 also preferably contains application load certificate (ALC) 113 data which is sent from the CA-2 119 to the application provider 101 and includes the application provider's public key, certified by CA-2 119. CA-2 119 provides an ALC 113 for each application which is to be loaded onto an IC card. In an embodiment, the application provider 101 and the IC card 103 both have individual public/private keys sets certified by different certification authorities CA-2 and CA-1, respectively. At least one of CA-1 and CA-2 may be part of a certification authority hierarchy. In such an embodiment, CA-1 and CA-2 may share the same root certification authority or may have different root certification authorities.

The authentication and security processes will now be described.

Figure 2:
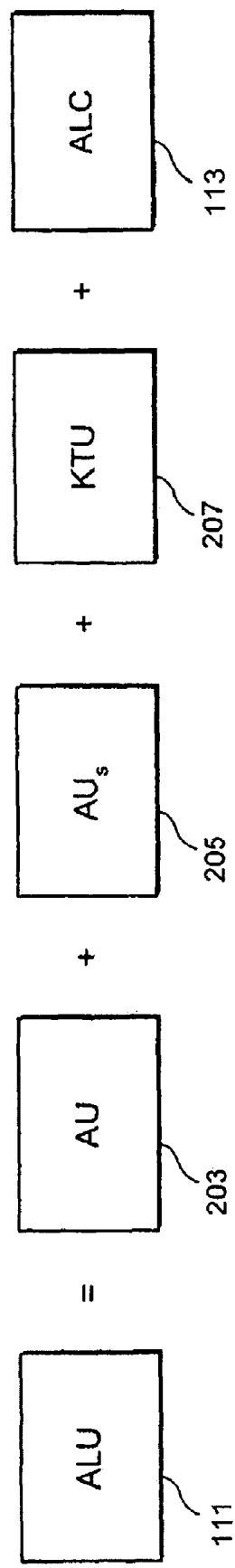
FIG. 2 is a graphic representation of the contents of an application loading unit 111.

FIG. 2 shows a diagram illustrating the components of an ALU 111 which is sent from the application provider 101 to the IC card 103 during the application load process. ALU 111 contains an application unit (AU) 203, an application unit signature ($AU_s$.) 205, a key transformation unit (KTU) 207, and an ALC 113. The ALU 111 is formatted in a conventional format used during data transmission. AU 203 contains the application code and data which are to be stored on the IC card, some or all of which is encrypted to protect a secret portion or portions of the code and/or data. AU 203 is described in further detail in connection with FIG. 3.

$AU_s$ 205 is the application code and data AU 203 digitally signed with the private key(s) of the application provider(s) 101. In one embodiment, the public key of each application provider 101 is sent as part of the ALC 113, and is used to authenticate the application provider 101 as the originator of the application. ALC 113 is made up of IC card identification information and the application provider's public key and is signed by the private key of the CA-2 119. All these elements will be described in more detail below.

Key transformation unit (KTU) 207 contains information relating to the encryption of the AU 203 (the code and data of the application), which allows the IC card 103 to decrypt the encrypted portions so that the application and data can be accessed by the IC card 103 while still being protected during transmission between the application provider 101 and the IC card 103. KTU 207 is encrypted (by application provider 101) with the public key of the IC card 103 for which the application is intended, so as to ensure that only the intended IC card 103 can decrypt the application code and data using the KTU 207 information. This element will be described in connection with FIG. 5.

Figure 3:
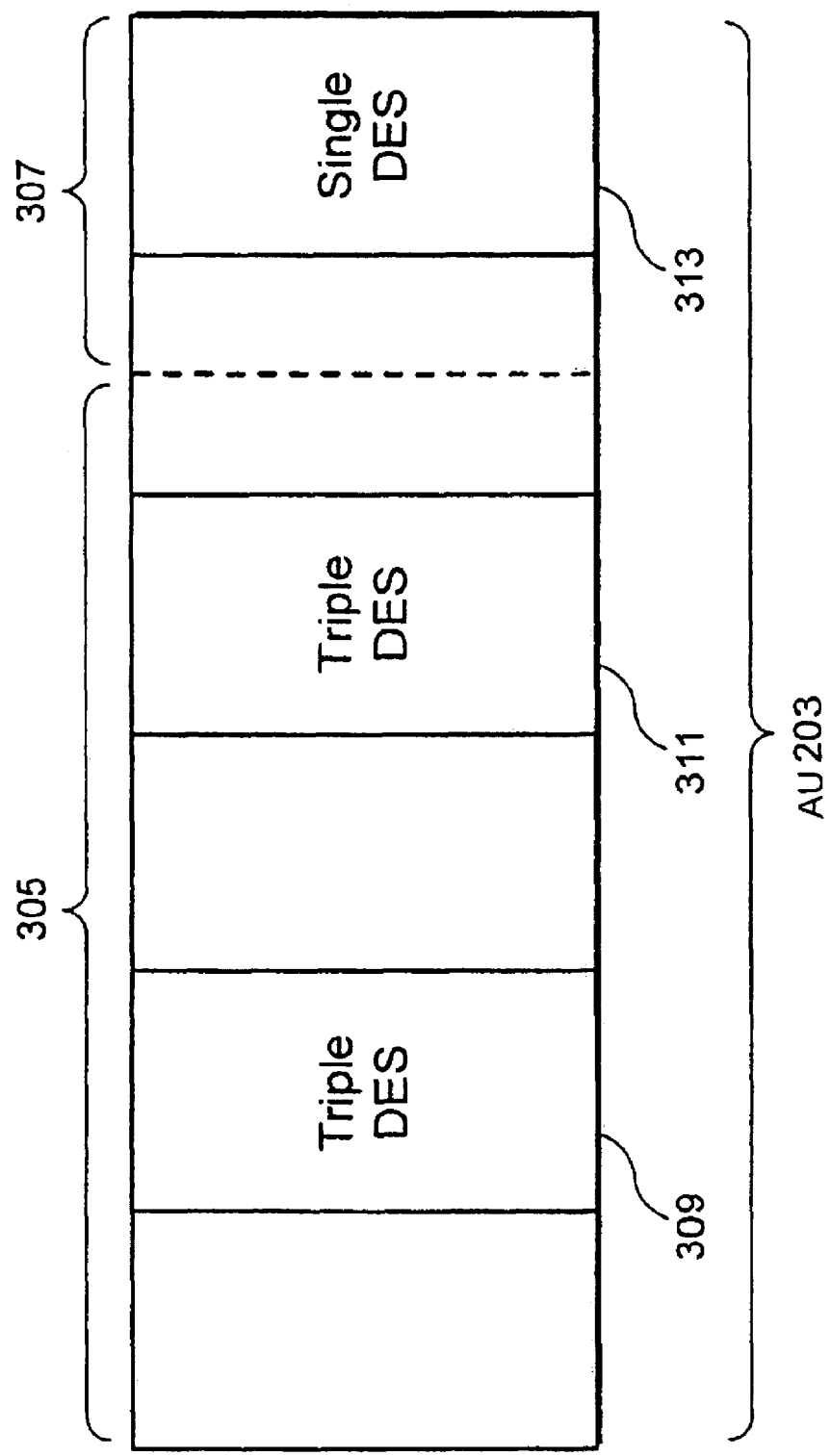
FIG. 3 is a graphic representation of an application unit 203.

FIG. 3 shows a graphic representation of the AU 203 which is part of the application load unit 111. The AU 203 contains both the program code and associated data which is to be loaded onto the IC card 103. The program code consists of a number of program instructions which are executed by the microprocessor on the IC card 103. The program instructions can be written in any programming language which the operating system stored on the IC card 103 can interpret.

For example, in the MULTOS system, the program can be written in MEL™ (MULTOS Executable Language). Most applications have associated data which must be loaded onto the IC card 103. For instance, data which identifies the IC card user such as a person's name or account number may be loaded in a secure manner with the credit/debit application. An application provider 101 may provide electronic cash, represented by data, as a promotion when installing an electronic purse application. Some or all of this data is desired to be kept secret from third parties. Additionally, the application code itself may be considered proprietary and portions may be desired to be kept secret from others. The use of key transformation unit 207 allows an application provider 101 (or a plurality of application providers 101) to designate and encrypt selected portions of its application as confidential and protect it from third parties. In the embodiment where a plurality of application providers 101 use the same software module 203 to transport several applications to IC card 103, each application provider 101 can be certified by a different CA-2.

Application unit (AU) portion 305 indicates the program code which is to be transferred from the application provider(s) 101 to the IC card 103. AU portion 307 indicates the associated data which is to be transferred as part of the application to be loaded onto the IC card 103. In this example, three discrete areas of the application unit are shown to be encrypted using either single DES or triple DES. Any number of variations regarding the portions encrypted and the type of encryption can be employed using the techniques described herein.

In this example, encrypted location 309 shows the first portion of the AU 203, which has been encrypted using a triple DES technique. The encryption process, as described above, involves using a symmetric key and the conventionally known DES-based algorithm to transform the data. The data can later be recovered by applying a key to the known DES-based decryption algorithm. Encrypted location 311 shows a second portion of the application unit 203, which has been encrypted using triple DES. Encrypted location 313 shows a third portion, which is encrypted using single DES. Single DES requires less computation to decrypt and takes up less space as part of the key transformation unit (KTU) 207 as described below. If the AU 203 were intercepted by a third party while it was being transmitted from the application provider 101 to the IC card 103, the encrypted portions could not be read unless the third party had the correct keys and decryption algorithm. That information, therefore, is protected in the KTU 207.

The KTU 207 is used to allow an intended IC card 103 (an IC card for which the application and associated data are intended) to decrypt the encrypted portions of the AU 203 by describing which portions of the AU 203 are encrypted, which encryption algorithm was used, and the key or keys to be used to decipher the text. This information is highly confidential between the application provider(s) 101 and the intended IC card 103, and therefore is protected in a manner unique to the intended IC card 103. In order to encrypt the KTU 207 which is part of the overall application load unit 111 being transmitted, an individual key set for the particular intended IC card 103 is used. The key set and its generation will now be described.

In accordance with the present invention, one of the security operations that may be performed at the certificate authority (CA-1) 109 is to generate an individualized key set for each IC card 103 which is stored on the IC card 103. The key set is used for off-card verification (i.e., to verify that the IC card 103 is an authentic IC card) and for secure data transportation. The key generation method is shown generally in FIG. 4. The key set is made up of three different key data items: the IC card's private key 190, which is known only to the IC card 103; the IC card's public key 150, which is stored on the IC card 103; and the IC card's public key certificate 170, which is the IC card's public key signed by the CA-1's private key. The individual keys of the key set are described in more detail below.

Step 401 stores an IC card specific transport private key 190 for the individual IC card 103 in the memory of the IC card 103. This private key 190 is generated by the CA-1 109 from a standard asymmetric encryption technique such as RSA™ and loaded onto the IC card 103 via an IC card acceptance device. Once stored on the IC card 103, the CA-1 109 deletes from its own memory any data relating to the private key 190. Thus, only the IC card 103 itself knows its private key 190. The data element containing the private key information in the IC card 103 is called "mkd_sk" which stands for MULTOS key data secret key.

Step 403 stores a card specific transport public key 150 for the individual IC card 103 in the memory of the IC card 103. This public key 150 is preferably generated by the CA-1 109 from the asymmetric encryption technique used to produce the private key 190 in step 401. As with the private key 190, once the public key 150 is stored on the IC card 103, the CA-1 109 (or other key provider) deletes from its systems the public key data, so that the only copy of the public key 150 is kept in the IC card 103. The data element containing the IC card's public key information is called "mkd_pk" which stands for MULTOS key data public key.

Step 405 stores a card specific transport public key certificate 170 for the individual IC card 103 in the memory of the IC card 103. The data element containing the IC card's public key certificate information is called "mkd_pk_c", which stands for MULTOS key data public key certificate. This public key certificate 170 is preferably generated by signing the transport public key mkd_pk with the private key of the CA-1 109, indicated as follows:

$$\text{Mkd\_pkc} = [\text{mdk\_pk}]_{CA\text{-}1\_sk}$$

which means the individual IC card's public key certificate is formed by applying the CA-1's private key to the individual IC card's public key. The process is carried out at the CA-1 109. The public key certificate 170 is retained by the CA-1 109 so that it can regenerate the public key 150 as needed.

A terminal or other device can read the public key certificate 170 from an IC card to verify that the CA-1 109 had signed and therefore approved the individual IC card 103. This is accomplished by verifying the public key certificate 170 with the public component of the CA-1 key set used to sign the mkd_pk. The decrypted public key certificate 170 can then be compared with the public key 150 to verify that the key certificate 170 was certified (signed) by the CA-1.

Figure 5:
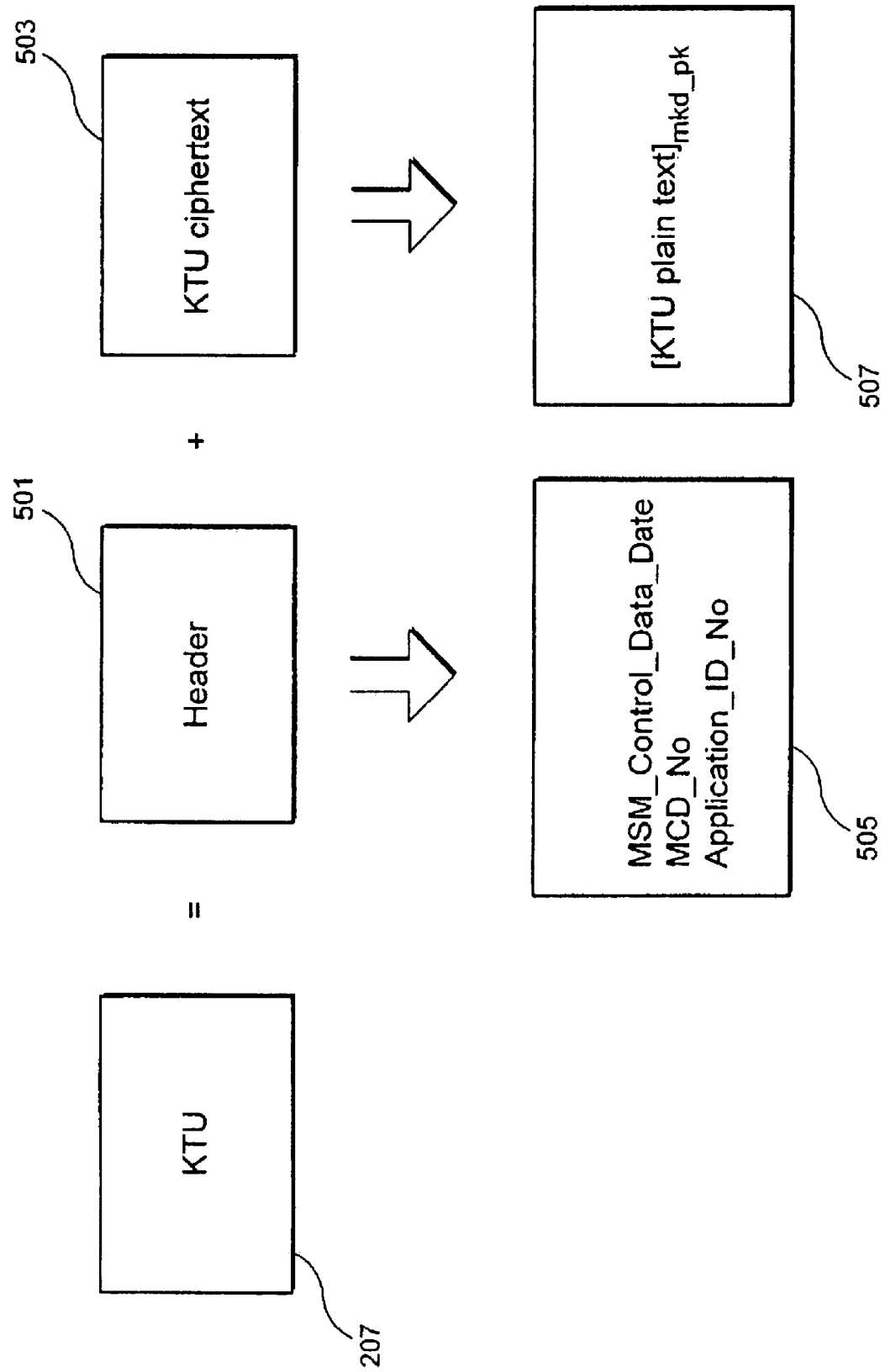
FIG. 5 is a graphic representation of a key transformation unit 207.

FIG. 5 is a graphic depiction of the contents of key transformation unit (KTU) 207, which contains header portion 501, and KTU ciphertext portion 503. As shown in FIG. 5, header information 501 includes, for example, identifier or permissions information 505 such as the application_id_no (application identification number), mcd_no (IC card no), and/or msm_control_data_date (the date the IC card 103 was issued). Additional identifiers could also be included. These identifiers allow the system to verify that an IC card which receives the application load unit 111 is the intended IC card 103. The permissions data is discussed in detail in the above referenced related U.S. Pat. No. 6,575,372.

KTU ciphertext 503 corresponds to KTU plaintext (not encrypted) encrypted with the public key mkd_pk of the intended IC card 103 as shown in box 507. The KTU plaintext is further described in FIG. 6. The public key mkd_pk is obtained from the intended IC card 103 by the application provider 101. The public key of an IC card 103 is freely available to anyone, and can be obtained directly from the IC card, from the certificate authority CA-1 109, or from some other location. By encrypting the KTU plaintext with the IC card public key 150, only the intended IC card 103 can use its private key 190 of the public/private key pair to decrypt the KTU ciphertext 503. This means that only the intended IC card 103 can determine the contents of the KTU plaintext, identify the encrypted portions of the application(s) being loaded, and use the keys to decrypt and recover the entire application(s) and associated data. Because no other entity has the private key 190 of the IC card 103, the security and integrity of the program code and data being transmitted are ensured.

Figure 6:
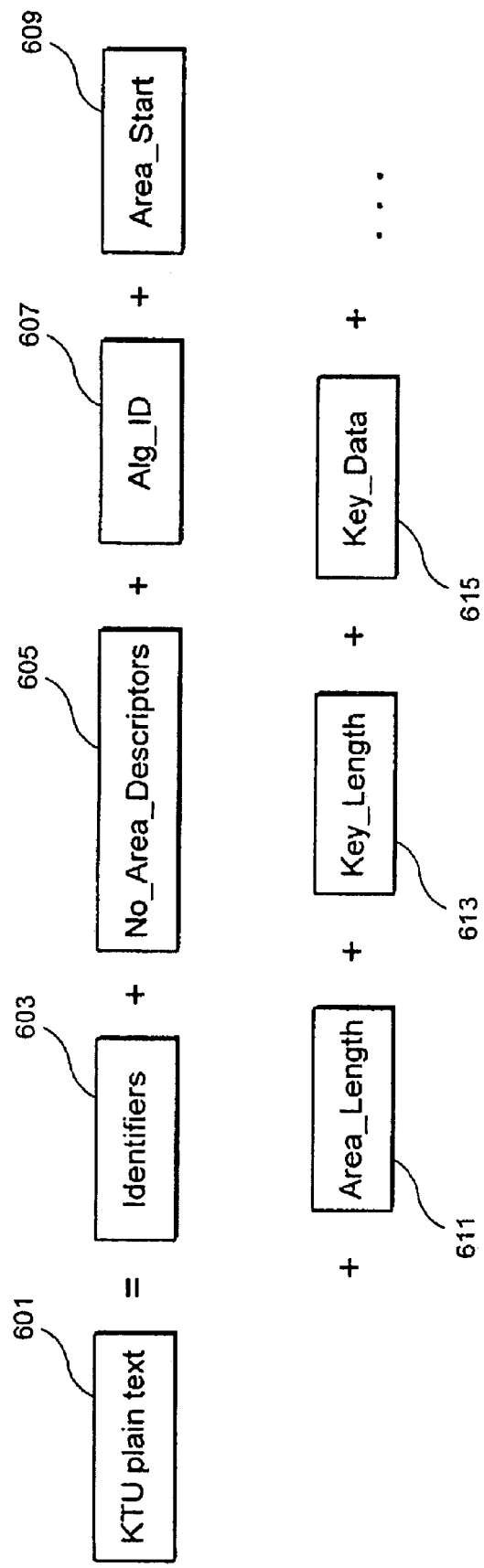
FIG. 6 is a graphic representation of a key transformation unit plaintext 601.

FIG. 6 is a graphic representation of KTU plaintext 601. KTU plaintext 601 preferably includes identifier field 603, no_area_discriptors field 605, alg_id field 607, area_start field 609, area-length 611, key_length field 613, key_data field 615, and additional area and key fields depending upon the number of encrypted areas present in the application unit (AU) 203. Identifiers 603 contain identifying information of the AU 203 to which the KTU 207 applies. No_area_descriptors 605 indicates how many different portions of the AU 203 have been encrypted. In the example of FIG. 3, the number of area descriptors is three. Field 607 contains the algorithm identifier for the first area which has been encrypted. The algorithm could be DES or triple DES, for example. Field 609 indicates the start of the first encrypted area. This indication could be an offset from the start of the AU 203. For example, the offset could be "100", which means that the first area starts at the 100$^{th}$ byte of the AU 203. Field 611 indicates the area length for the first encrypted portions. This field allows the microprocessor on the IC card 103 to know how large an area has been encrypted, and, when coupled with the start of the area, allows the IC card 103 microprocessor to decrypt the correct portion of the AU 203. Field 613 indicates the key length for the particular encrypted portion of the AU 203. The length of the key differs for different encryption techniques. The key length field allows the IC card 103 to know the length of the key data. Field 615 indicates the key data for the particular encrypted portion. The key data is used with the algorithm identity and the location of the encoded portion to decode the encrypted portion. When more than one encrypted area is indicated, each encrypted portion can be encrypted by a different transport key and associated algorithm, and additional data referring to each algorithm, start location, length, key length, and key data are present in the KTU plaintext 601. While a number of fields have been described, not all the fields are necessary for the invention. The most important field, however, is the key data 615 itself.

Figure 7:
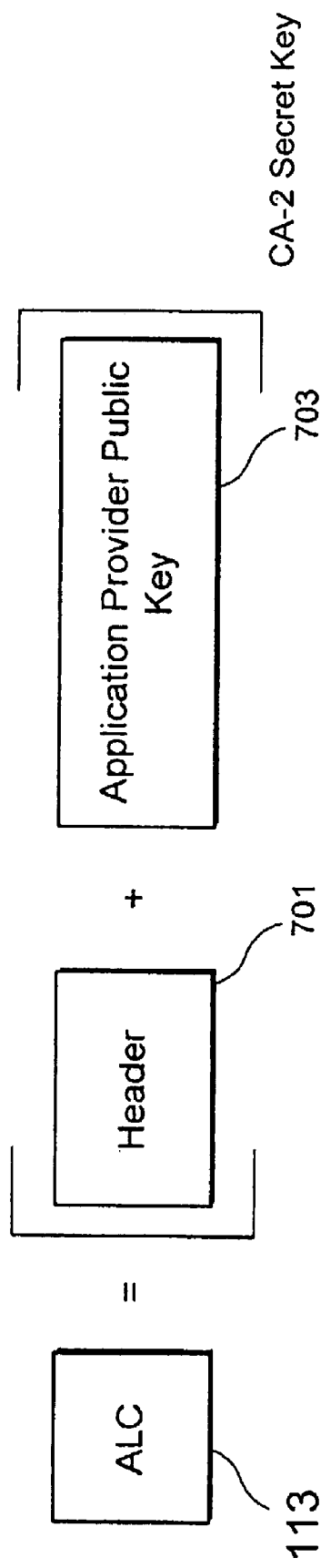
FIG. 7 is a graphic representation of an application load certificate 113.

FIG. 7 is a graphic representation of the application load certificate (ALC) 113. ALC 113 includes a header 701 and the application provider 101 public key 703. Header 701 and application provider public key 703 are then signed (encrypted) with the certificate authority 119 (CA-2) private key. Thus, the ALC 113 must be provided to the CA-2 119 by the application provider 101 for each application loaded, because only the CA-2 119 knows the CA-2 private key. Header 701 contains information regarding the application provider 101 and the IC card 103 for which the application is intended. The ALC 113 is placed in the correct application load unit (ALU) 111 by the application provider 101 which can use the identification information. Application provider public key 703 is provided to the CA-2 119 along with the identification data. The CA-2 119 then signs this information after verifying its authenticity, and returns the signed ALC 113 to the application provider 101. The IC card 103, when it receives the ALC 113 as part of the ALU 111, verifies the ALC 113 with the public key of the CA-2 119. This ensures that the CA-2 119 signed the ALC 113 and that it is genuine. After verifying the information, the header identification information 701 is checked and the application provider 101 public key is recovered. This public key is used to verify that the application and code which is to be loaded onto the IC card 103 originated with the proper application provider 101.

Figure 8:
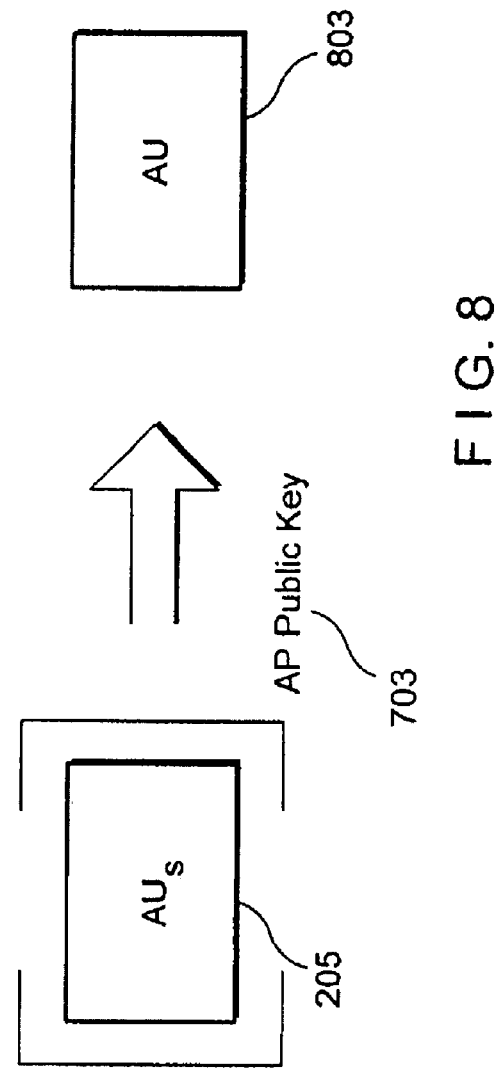
FIG. 8 is a graphic representation of an application unit 803 being decrypted.

FIG. 8 is a graphic representation of the use of the application provider's public key to verify the signature of the application unit signature (AU$_s$) 205 in order to verify that application unit (AU) 203 was signed by the application provider 101. AU$_s$ 205 is verified with the application provider public key 703. The recovered AU 803 is then compared with AU 203. When the data blocks match, the IC card 103 has verified that the application provider 101 signed (encrypted) the AU 203, and that the application is genuine. This authentication is valid, because only the application provider 101 has its own private key. The IC card 103 can process this information efficiently, because the application provider's public key 703 is preferably provided to it as part of the ALC 113, which is signed by the CA-2 119. Therefore, it does not need to retrieve the public key 703 from an external location to authenticate the application.

Figure 9:
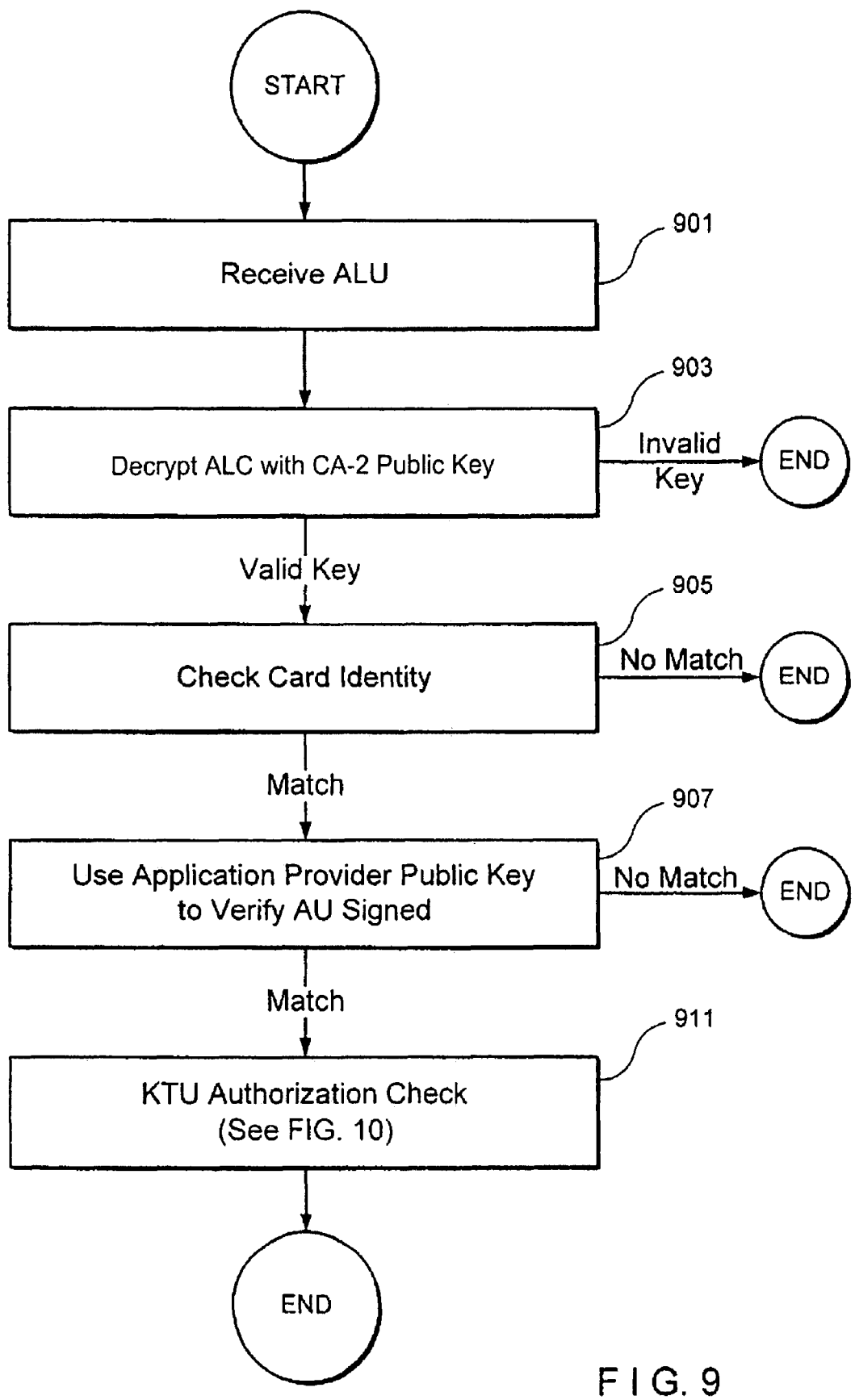
FIG. 9 is a flowchart illustrating steps undertaken in processing an application load unit 111.

FIG. 9 shows a flow chart of the steps for processing the application load unit (ALU) 111 when it is received by the IC card 103. Prior to receiving the ALU 111, identity checks as to the identity of the IC card 103 can be performed, if desired. The ALU processing techniques provide a number of further verifications, including verifying that the application being loaded is: (1) from the correct application provider 101, (2) being loaded onto the intended IC card 103, and (3) certified by the CA-2 119. The ALU processing techniques also allow the transportation of transport decryption keys, which enable the IC card 103 to decrypt portions of the program code and associated data in a secure manner. In step 901, IC card 103 receives ALU 111 from the application provider 101. ALU 111 can be transmitted via a terminal connection, contactless connection, telephone, computer, intranet, Internet, or any other communication means 107. The ALU 111 is placed in an I/O buffer of the IC card 103 along with header information indicating the starting addresses of AU 203, AU, 205, the key transformation unit 207, and ALC 113. Alternatively, IC card 103 could determine the relative address locations of these four units.

Step 903 decrypts ALC 113 with the public key of CA-2 119. Each IC card 103 preferably stores in its memory a copy of the CA-2 public key, because it is used in many transactions. Alternatively, the IC card 103 could obtain the public key of CA-2 119 from a known storage location. When the CA-2 public key successfully verifies the ALC 113, IC card 103 has verified that CA-2 119 has signed ALC 113 with its private key and, thus, that ALC 113 is proper. When IC card 103 cannot verify ALC 113 successfully, IC card 103 concludes that ALC 113 was not signed by CA-2 119 and the certificate is not proper. The application loading process then ends.

Step 905 then checks the identity of IC card 103 against the identification information sent in ALC 113 to make sure the IC card 103 is intended to receive the application. This permissions checking is described in the related patent identified above. When there is no match of identification data, the application loading process ends. When the identification data does match, the process continues.

Step 907 uses the application provider's public key 703, which was recovered from the verified ALC 113, to verify application unit signature (AU$_s$) 205. When the application load unit (ALU) 111 was generated by the application provider 101, the application unit 203 was signed with the application provider's private key to authenticate that the application was provided by the correct application provider 101. The application provider 101 then preferably provides its public key to IC card 103 through the ALC 113. The IC card 103 then verifies the AU, 205. When the ALU 111 is successfully verified, it is accepted as having been generated by the application provider 101. Because the application provider's public key 703 is part of ALC 113 which is signed by the certificate authority (CA-2) 119, CA-2 119 can make sure that the proper public key 703 has been provided to IC card 103. This unique key interaction between the application provider 101, CA-2 119 and the intended IC card 103 ensures that no counterfeit or unapproved applications or data are loaded onto an IC card 103 which is part of the secure system.

Step 911 then processes a key transformation unit (KTU) authentication check, which further verifies that only the intended IC card 103 has received the application. The KTU authentication check makes sure that, when a third party does somehow intercept ALU 111, the third party cannot read the enciphered portions of the application unit (AU) 203 and cannot retrieve the keys to decrypt AU 203. This step is further explained in FIG. 10.

Figure 10:
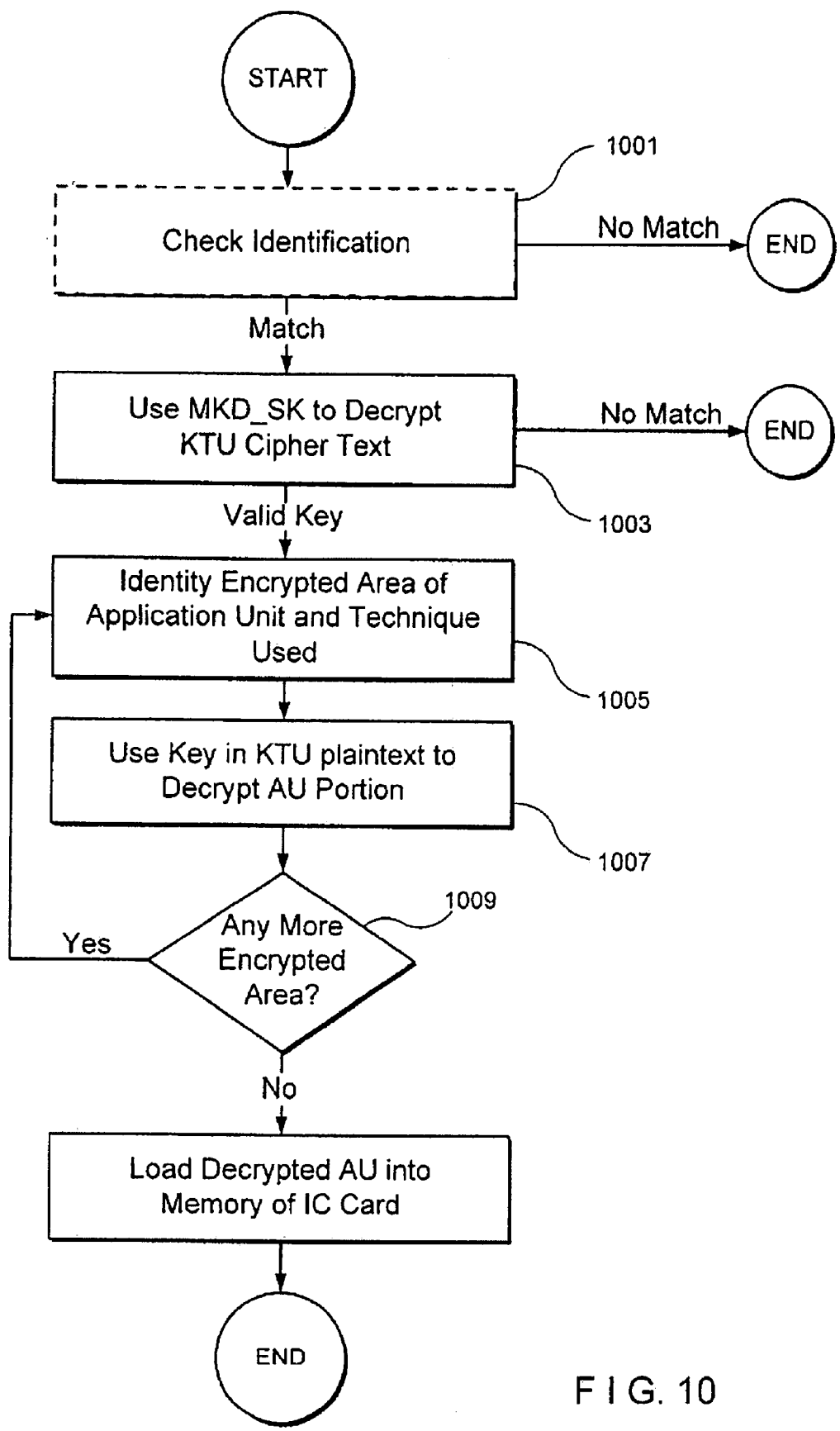
FIG. 10 is a flowchart illustrating steps undertaken in processing a key transformation unit 207.

FIG. 10 shows the steps of the KTU authentication process. Step 1001, which is shown in dashed lines because it is optional, checks the identification of IC card 103 a second time. The identification information can be sent as part of the KTU data. However, this check is optional as it has already been performed once in step 905.

Step 1003 then decrypts KTU ciphertext 503 using the IC card's private key (mkd_sk). The KTU plaintext was previously encrypted using the intended IC card's public key (mkd_pk). This means that only the holder of the intended IC card's private key could decrypt the encrypted message. The application provider 101 obtains the intended IC card's public key either from the IC card 103 itself (See FIG. 4 and related text for a discussion of the mkd key set) or from a database holding the public keys. When the IC card 103 cannot decrypt the KTU ciphertext properly, IC card 103 concludes that KTU 207 is not meant for that IC card 103 and the application loading process halts. When the IC card 103 does properly decipher the KTU ciphertext, the process continues.

Step 1005 identifies an encrypted area(s) of the application unit (AU) 203. In the example of the KTU plaintext described in connection with FIG. 6, IC card 103 uses a relative starting address and area length field to determine each encrypted portion. Step 1005 also identifies which encryption technique(s) was (were) used to encrypt the identified portion(s) so that the proper decryption technique(s) can be used. For example, the technique(s) could by single or triple DES. Alternatively, the technique could be a default technique used in the system and need not be identified.

Step 1007 then retrieves the key(s) from KTU plaintext and decrypts the identified portion(s) with the identified decryption technique(s). This allows IC card 103 to have the decrypted portion(s) of AU 203, which it will store in its EEPROM once all the encrypted portions have been decrypted.

Step 1009 checks whether there are any other additional encrypted areas. In the example described in FIG. 3, there are three encrypted areas. The number of encrypted areas was a field in the example of FIG. 6. However, the number of portions can be determined using other conventional means. When there are additional encrypted portions, the process jumps to step 1005. When there are no additional encrypted portions, the process continues with step 1011.

Step 1011 then loads the decrypted application unit 203 into the memory of IC card 103. The application load unit (ALU) has passed all of the authentication and decryption checks and the application(s) can now properly reside on IC card 103 and be executed and used by the IC card user. While the different checks have been presented in a particular order in FIGS. 9 and 10, the checks can be performed in any order. While all of the described techniques used in conjunction with the ALU provide the best security, one or more of the individual techniques could be used for their individual purposes or combined with other conventional security techniques.

Figure 11:
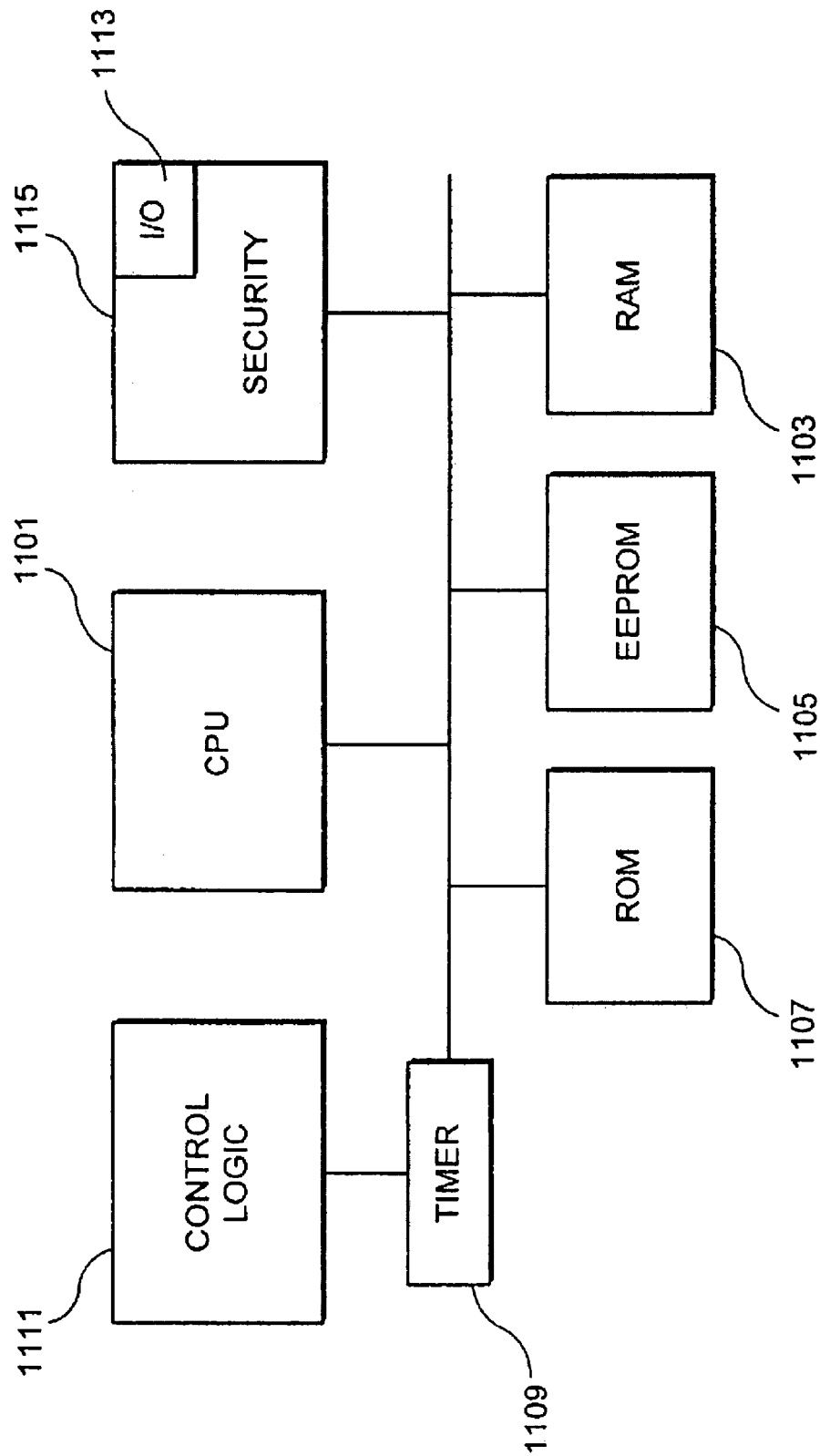
FIG. 11 is a block diagram showing components of an IC card 103 which can receive and process an application load unit 111.

FIG. 11 shows an example of a block diagram of an IC card chip upon which an ALU can be loaded and processed. An integrated circuit is located on an IC card for use. The IC card preferably includes a central processing unit 1101, a RAM 1103, an EEPROM 1105, a ROM 1107, a timer 1109, control logic 1111, an I/O port 1113 and security circuitry 1115, which are coupled together by a conventional data bus.

Control logic 1111 provides sufficient sequencing and switching to handle read-write access to the IC card's memory through the input/output ports 1113. Central processing unit (CPU) 1101 with its control logic 1111 can perform calculations, access memory locations, modify memory contents, and manage input/output ports. Some IC cards (103) have a coprocessor for handling complex computations such as performing cryptographic operations. Input/output ports 1113 are used under the control of CPU 1101 and control logic 1111, for communications between the IC card (103) and a card interface device. Timer 1109 (which generates or provides a clock pulse) drives the control logic 1111 and CPU 1101 through a sequence of steps that accomplish memory access, memory reading or writing, processing, and data communication. A timer may be used to provide application features such as call duration. Security circuitry 1115 includes fusible links that connect the input/output lines to internal circuitry as required for testing during manufacture, but which are destroyed ("blown") upon completion of testing to prevent later access. After the ALU has been authenticated and verified, the data from application unit 203 is stored in EEPROM 1105. The IC card private key 190 is stored in a secure memory location. The IC card public key 150 and public key certificate 170 are preferably stored in EEPROM 1105. The authentication process as described herein is performed by CPU 1101.

FIG. 11 also shows a possible configuration for the integrated circuit chip for the application provider 101, transmitting entity 10 and for each certificate authority 109, 119. CPU 1101 present in IC card 103 for the application provider 101 encrypts the necessary information using encryption techniques described herein, and performs the necessary data operations. CPU 1101, present in CA-1 109 and CA-2 119, is used to sign the application load and the public key certificate as described herein.

The foregoing merely illustrates the principles of the invention. It will thus be appreciated that those skilled in the art will be able to devise numerous systems and methods which, although not explicitly shown or described herein, embody the principles of the invention and are thus within the spirit and scope of the invention.

For example, while loading an application is discussed herein, the same secure loading processes can apply to transmitting other types of data such data blocks, database files, word processing documents, or any other type of software module or data need to be transmitted in a secure manner. Moreover, the same secure loading processes can be used when the software module has a plurality of portions and/or providers 101 and each portion is digitally signed by a different software provider 101, in which case each software provider may have a different CA-2.

Furthermore, although the foregoing description of the preferred embodiments revolves around a discussion of IC cards (or "smart cards"), the presently claimed methods and apparati are applicable to all tamper resistant modules generally, and not just to such cards. Thus, the term "tamper resistant module" can be used in lieu of the term "IC card" or "smart card" throughout this written description. The term "tamper resistant module" includes, but is not limited to, one or more IC cards, smart cards, dongles, PC cards, and/or PCMCIA cards. The IC cards, smart cards, dongles, PC cards, and/or PCMCIA cards may be coupled to one or more computers. Moreover, the term "personal computer/tamper resistant module combination" can be substituted for "IC card" or "smart card" throughout this written description, and the term "PC" as used herein can mean any type of computer.

Similarly, it will be appreciated that references to "software" modules include modules that can be implemented in any combination of software, firmware, and/or hardware. Such modules can be embodied in one or more computer-readable media, such as one or more hard disks, floppy disks, CD's, DVD's, etc.

We claim:

1. A method for securely loading a software module over a communications network from a software provider (SP) onto a tamper resistant module (TRM), said method comprising the steps of:

the SP:
encrypting, using at least one transport key, at least one portion of the software module, each said portion having an indication of location of said portion;
encrypting each transport key and each indication using an asymmetric TRM public key, thereby forming a key transformation unit (KTU), said TRM public key having a corresponding TRM private key, said TRM public key and corresponding TRM private key being certified by a first certification authority (CA-1);
digitally signing the encrypted portion(s) with at least one asymmetric SP private key, each said SP private key having a corresponding SP public key, to produce a signed software module, each SP public key being certified by a second certification authority (CA-2), CA-2 being different than CA-1; and
transmitting the portion(s), the KTU, and the signed software module to the TRM over the communications network; and the TRM:
recovering the transport key(s) and the indication(s) by decrypting the KTU using the TRM private key;
identifying the portion(s) using the recovered indication(s);
verifying the certified SP public key using the public key of CA-2;
authenticating the portion(s) using the certified SP public key; and
decrypting the portion(s) using the recovered transport key(s).

2. The method of claim 1 wherein the TRM generates the TRM public key and the corresponding TRM private key, and supplies said TRM public key to CA-1 for certification.

3. The method of claim 1 wherein the TRM is a subscriber identification module (SIM) within a mobile telephone.

4. The method of claim 1 wherein the communications network is a network from the group of networks consisting of the Internet and a telephone network.

5. The method of claim 1 wherein CA-1 is an agent of an issuer of IC cards.

6. The method of claim 1 wherein CA-1 is an agent of an operator of a telephone network.

7. The method of claim 1 wherein CA-2 is agent of a provider of software applications.

8. The method of claim 1 wherein the tamper resistant module is an item from the group of items consisting of IC cards, smart cards, dongles, PC cards, PCMCIA cards, and personal computer/tamper resistant module combinations.

9. The method of claim 1 wherein CA-1 digitally signs the TRM public key to produce a TRM public key certificate unique to the TRM, and said TRM public key certificate is stored on said TRM.

10. The method of claim 1 wherein the SP verifies the TRM public key certificate prior to the transmitting step.

11. The method of claim 1 wherein at least one transport key is a symmetric key.

12. The method of claim 1 wherein the software module has a plurality of portions, each portion being digitally signed by a different SP.

13. The method of claim 12 wherein each SP has a different CA-2.

14. The method of claim 1 wherein the KTU indicates at least one encryption technique used to encrypt the portion(s).

15. The method of claim 1 wherein a plurality of portions of the software module are encrypted by the SP, and at least two different transport keys are used to encrypt said portions.

16. The method of claim 1, wherein the SP sends the certified SP public key to the TRM over the communications network.

17. The method of claim 1 wherein at least one of CA-1 and CA-2 is part of a certification authority hierarchy.

18. The method of claim 17 wherein CA-1 and CA-2 share the same root certification authority.

19. The method of claim 17 wherein CA-1 and CA-2 have different root certification authorities.

20. A method for securely loading a software module over a communications network from a software provider (SP) onto a tamper resistant module (TRM), said method comprising the following steps performed by said SP:
   encrypting, using at least one transport key, at least one portion of the software module, each said portion having an indication of location of said portion;
   encrypting each transport key and each indication using an asymmetric TRM public key, thereby forming a key transformation unit (KTU), said TRM public key having a corresponding TRM private key, said TRM public key and corresponding TRM private key being certified by a first certification authority (CA-1);
   digitally signing the encrypted portion(s) with at least one asymmetric SP private key, each said SP private key having a corresponding SP public key, to produce a signed software module, each SP public key being certified by a second certification authority (CA-2), CA-2 being different than CA-1; and
   transmitting the portion(s), the KTU, and the signed software module to the TRM over the communications network, wherein:
      the TRM is capable to identify the portion(s) using the indication(s), after recovering said indication(s) by decrypting the KTU using the TRM private key;
      the TRM is capable to authenticate the portion(s) using the certified SP public key, after verifying said certified SP public key with the public key of CA-2; and
      the TRM is capable to decrypt the portion(s), using the recovered transport key(s), after recovering said transport key(s) by decrypting the KTU using the TRM private key.

21. A method for securely loading a software module over a communications network from a software provider (SP) onto a tamper resistant module (TRM), said method comprising the following steps performed by said TRM:
   receiving from the SP over the communications network at least one portion of the software module, a key transformation unit (KTU), and said software module having been encrypted and digitally signed by, wherein:
      associated with each portion is an indication of location of said portion;
      the KTU comprises at least one encrypted transport key and at least one encrypted indication of location, each encrypted transport key and each encrypted indication being encrypted using an asymmetric TRM public key, said TRM public key having a corresponding TRM private key, said TRM public key and corresponding TRM private key being certified by a first certification authority (CA-1); and
      the digitally signed software module comprises the portion(s), after having been encrypted by the transport key(s), being digitally signed with at least one asymmetric SP private key, each said SP private key having a corresponding SP public key, each SP public key being certified by a second certification authority (CA-2), CA-2 being different than CA-1;
   recovering the transport key(s) and the indication(s) by decrypting the KTU using the TRM private key;
   identifying the portion(s) using the recovered indication(s);
   verifying the certified SP public key using the public key of CA-2;
   authenticating the portion(s) using the certified SP public key; and
   decrypting the portion(s) using the recovered transport key(s).

22. A computer readable storage medium storing a computer program product for securely loading a software module over a communications network from a software provider (SP) onto a tamper resistant module (TRM), said computer program product comprising:
   program code for encrypting, using at least one transport key, at least one portion of the software module, each said portion having an indication of location of said portion;
   program code for encrypting each transport key and each indication using an asymmetric TRM public key, thereby forming a key transformation unit (KTU), said TRM public key having a corresponding TRM private key, said TRM public key and corresponding TRM private key being certified by a first certification authority (CA-1);
   program code for digitally signing the encrypted portion(s) with at least one asymmetric SP private key, each said SP private key having a corresponding SP public key, to produce a signed software module, each SP public key being certified by a second certification authority (CA-2), CA-2 being different than CA-1;
   program code for transmitting the portion(s), the KTU, and the signed software module to the TRM over the communications network from the SP to the TRM;
   program code for recovering the transport key(s) and the indication(s) by decrypting the KTU using the TRM private key;
   program code for identifying the portion(s) using the recovered indication(s);
   program code for verifying the certified SP public key using the public key of CA-2;
   program code for authenticating the portion(s) using the certified SP public key; and
   program code for decrypting the portion(s) using the recovered transport key(s).

* * * * *